(12) United States Patent
Prager et al.

(10) Patent No.: US 9,338,241 B2
(45) Date of Patent: May 10, 2016

(54) TRACKING CONTACTS ACROSS MULTIPLE COMMUNICATIONS SERVICES

(71) Applicant: INTERNATIONAL BUSINESS MACHINES CORPORATION, Armonk, NY (US)

(72) Inventors: Scott H. Prager, Stratham, NH (US); Anuphinh Phimmasorn Wanderski, Durham, NC (US); Eric M. Wilcox, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/788,390

(22) Filed: Mar. 7, 2013

(65) Prior Publication Data
US 2014/0258502 A1   Sep. 11, 2014

(51) Int. Cl.
*H04L 29/08* (2006.01)
*G06Q 10/10* (2012.01)

(52) U.S. Cl.
CPC ............... *H04L 67/22* (2013.01); *G06Q 10/10* (2013.01); *H04L 29/08675* (2013.01)

(58) Field of Classification Search
USPC ...................................................... 709/224
See application file for complete search history.

(56) References Cited

U.S. PATENT DOCUMENTS

| | | | | |
|---|---|---|---|---|
| 6,973,299 | B2 * | 12/2005 | Apfel | H04M 1/274516 379/266.1 |
| 7,739,246 | B2 * | 6/2010 | Mooney | G06F 17/30578 707/687 |
| 7,940,910 | B2 | 5/2011 | Chatterjee et al. | |
| 2003/0083917 | A1 * | 5/2003 | Tracey | G06Q 10/063114 705/7.33 |
| 2005/0027716 | A1 * | 2/2005 | Apfel | H04M 1/274516 |
| 2005/0159970 | A1 * | 7/2005 | Buyukkokten | G06Q 30/02 705/319 |
| 2005/0165584 | A1 * | 7/2005 | Boody | G06F 11/302 702/186 |
| 2005/0165920 | A1 * | 7/2005 | Kerr | G06F 3/0481 709/223 |
| 2006/0195472 | A1 | 8/2006 | Cadiz et al. | |
| 2007/0150444 | A1 * | 6/2007 | Chesnais | H04W 4/02 |
| 2007/0174432 | A1 * | 7/2007 | Rhee | H04M 1/72522 709/219 |
| 2008/0155471 | A1 * | 6/2008 | Lynn | H04M 1/72547 715/811 |
| 2009/0029674 | A1 * | 1/2009 | Brezina | H04M 15/00 455/405 |
| 2010/0228560 | A1 * | 9/2010 | Balasaygun | G06F 17/30876 705/1.1 |
| 2010/0330972 | A1 * | 12/2010 | Angiolillo | H04M 1/274583 455/418 |
| 2011/0143713 | A1 | 6/2011 | Luft et al. | |
| 2012/0063585 | A1 * | 3/2012 | Gravino | H04M 1/274516 379/218.01 |
| 2012/0096523 | A1 | 4/2012 | Ollila et al. | |
| 2012/0150970 | A1 * | 6/2012 | Peterson | G06F 3/04817 709/206 |
| 2012/0158744 | A1 | 6/2012 | Tseng et al. | |
| 2012/0210253 | A1 | 8/2012 | Luna et al. | |
| 2012/0254169 | A1 * | 10/2012 | Landsman | G06Q 30/02 707/736 |
| 2012/0331418 | A1 * | 12/2012 | Bonforte | G06Q 10/107 715/784 |

* cited by examiner

*Primary Examiner* — Philip Chea
*Assistant Examiner* — Wuji Chen
(74) *Attorney, Agent, or Firm* — Charles L. Moore; Moore & Van Allen PLLC

(57) ABSTRACT

A method for tracking at least recent contacts and favorite contacts across multiple communications services may include collecting, by a processor, information associated with a plurality of contact interactions of a user from each of a set of different communications services utilized by the user. The method may also include storing, by a storage device, the information associated with each of the plurality of contact interactions. The method may additionally include analyzing the information associated with each of the plurality of contact interactions. The method may further include determining at least one of a list of most recent contacts and a list of favorite contacts from analyzing the information associated with each of the plurality of contact interactions.

22 Claims, 3 Drawing Sheets

TRACKING CONTACTS ACROSS MULTIPLE COMMUNICATIONS SERVICES

BACKGROUND

Aspects of the present invention relate to communications services, systems, social networks and the like, and more particularly to tracking at least recent and favorite contacts across multiple services, communications systems or social networks.

There are numerous communications services, communications systems, communications networks or social networks for communications between users, such as email, instant messaging (IM), chat, online forums, Lotus Notes®, Sametime®, IBM Connections, Facebook®, LinkedIn® or similar communications systems, networks or services. Lotus Notes® and Sametime® are trademarks of the Lotus Development Corporation in the United States, other countries or both. IBM Connections is a trademark of International Business Machines Corporation in the United States, other countries or both. Facebook® is a trademark of Facebook, Inc. in the United States, other countries or both. LinkedIn® is a trademark of LinkedIn Ltd. in the United States, other countries or both. Each of these systems or services typically include an arrangement for storing and maintaining a list of contacts or to permit users to save a list of contacts or addresses that the user expects to contact or communicate with on a recurring basis within the particular system or service. The contacts or list of contacts are proprietary or exclusive to a particular system or service and may be tracked only within the particular communications service or system. A user would typically be required to manually copy contacts from one service or system to another. Contacts for the same person or user may also be different from one service or system to another. Additionally, users typically utilize more than one such system or service. Tracking and analyzing contacts across multiple services or systems that may be utilized by a user presents substantial complexities that need to be overcome.

BRIEF SUMMARY

According to an aspect of the present invention, a method for tracking at least recent contacts and favorite contacts across multiple communications services may include collecting, by a processor, information associated with a plurality of contact interactions of a user from each of a set of different communications services utilized by the user. The method may also include storing, by a storage device, the information associated with each of the plurality of contact interactions. The method may additionally include analyzing the information associated with each of the plurality of contact interactions. The method may further include determining at least one of a list of most recent contacts and a list of favorite contacts from analyzing the information associated with each of the plurality of contact interactions.

According to another aspect of the present invention, a system for tracking at least recent contacts and favorite contacts across multiple communications services may include a processor and a module operating on the processor for collecting information associated with a plurality of contact interactions of a user from each of a set of different communications services utilized by the user. The system may also include a storage device for storing the information associated with each of the plurality of contact interactions. The system may additionally include a module for analyzing the information associated with each of the plurality of contact interactions. The system may further include a module for determining at least one of a list of most recent contacts and a list of favorite contacts from analyzing the information associated with each of the plurality of contact interactions.

According to a further aspect of the present invention, a computer program product for tracking at least recent contacts and favorite contacts across multiple communications services may include a computer readable storage medium having computer readable program code embodied therewith. The computer readable program code may include computer readable program code configured to collect information associated with a plurality of contact interactions of a user from each of a set of different communications services utilized by the user. The computer readable program code may also include computer readable program code configured to store the information associated with each of the plurality of contact interactions, and computer readable program code configured to analyze the information associated with each of the plurality of contact interactions. The computer readable program code may further include computer readable program code configured to determine at least one of a list of most recent contacts and a list of favorite contacts from analyzing the information associated with each of the plurality of contact interactions.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
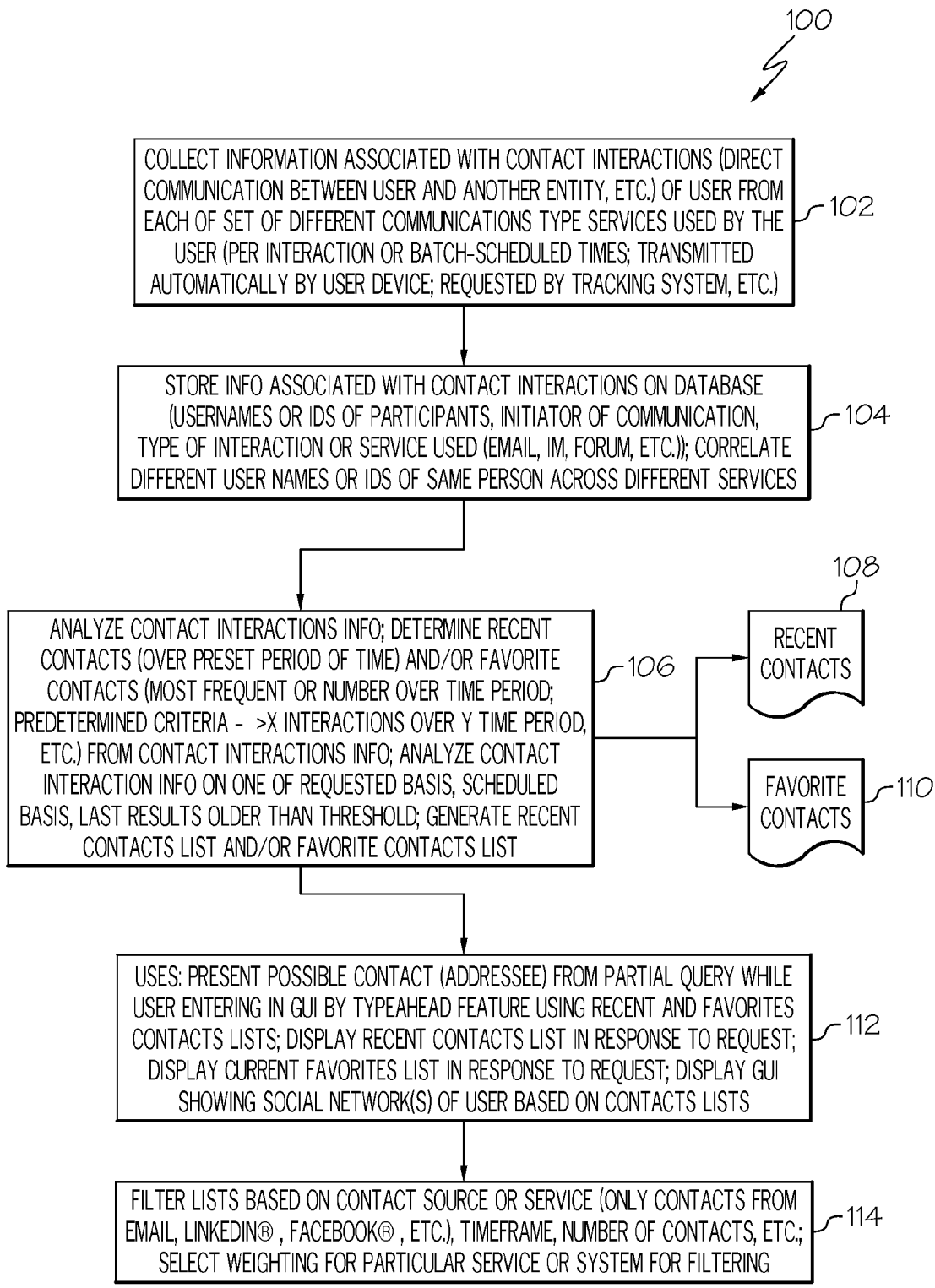
FIG. 1 is a flow chart of an example of a method for tracking at least recent and favorite contacts across multiple communications services in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with an embodiment of the present invention, a system for tracking at least recent contacts and favorite contacts may include a mechanism for gathering or collecting information associated with a plurality of contact interactions or usage across multiple communications services, a mechanism for analyzing the information or usage, and a mechanism for providing the results of the analysis in a manner which is usable. As used herein a communications service may include but is not necessarily limited to communications systems, communications networks or social networks for communications between users, such as email, IM, chart, online forums, Lotus Notes®, Sametime®, IBM Connections, Facebook®, LinkedIn® or similar communications systems, networks or services.

Examples of uses of the results of the analysis of the information associated with the contact interactions or usage may include, but is not necessarily limited to: providing at least a list of recent contacts and a list of favorite contacts; a typeahead feature that completes a sequence of possible alphanumeric characters and presents one or more possible contacts for selection by the user; providing a graphical user interface (GUI) displaying a user's network of contacts or social networks for each communications service or a combined representation of the user's networks or social networks; and any other practical applications of the contact lists across the multiple communications services resulting from the analysis of the information. The favorite contact list may be a list of contacts that the user communicates with at least a predetermined number of times over a preset time period. The typeahead feature may also be described as providing high-speed search results based off a partial query while the user is typing in a graphical user interface (GUI), such as an address field of a communications service application.

Examples of mechanisms for gathering information related to contact interactions may include posting information associated with each contact interaction to the system, batching multiple contact interactions, pull/push of contact information from/to the system. The system may maintain an database of contact activity across the multiple communications services using either proprietary or standard mechanisms for gathering the information associated with the contact interactions or usage.

The mechanism for analyzing the information leverages this data to compute derived contact lists which may include a list of recently used contacts of the user and a list of most commonly used contacts over time (favorite contacts). These lists may be updated either real-time or periodically based on new incoming contact interaction information from the collecting mechanism.

The mechanism for providing the results of the analysis may provide the data or contacts lists through either or both a GUI and programmatic interaction, such as an application programming interface (API). The GUI may provide simple capability such as typeahead against this list similar to that previously described, or more advanced capability such as network visualization. The API may be used by other products or communications applications of the user to enhance the contact listing of people associated with these other services or applications. In this respect, a more accurate selection list of people or contacts may be provided among the various communications services or applications of the user. The API may also track activity across a user's aggregated list of either recent or favorite contacts or both.

Advantages of the system, method and computer program product described herein provide an improvement in the advantages gained by a single-system of recent and favorite contacts. Such capabilities in the context of a single service/system/product may provide a user with a smaller list from which to choose contacts for most interactions as well as being able to better tune capabilities such as activity logs, expert location or network analysis across a user's contacts. The collection and analysis across multiple products or communications services may provide a more accurate and consistent list of contacts. This consistency may be of value in that one is more likely to email not only someone who has emailed recently, but also someone with whom a user has chatted with recently, for example.

FIG. 1 is a flow chart of an example of a method 100 for tracking at least one of recent and favorite contacts across multiple communications services in accordance with an embodiment of the present invention. In block 102, information associated with a plurality of contact interactions of a user may be collected from each of a set of different communications type services utilized by the user. One or more mechanisms may be provided for gathering information associated with the contact interactions from the set of services. What constitutes a contact interaction or criteria for collecting the information may be determined either by the particular communications service that is the source of the contact interaction information or a system that analyzes the information associated with each contact interaction. For example, receiving an email addressed directly to the user might represent a contact interaction for purposed of collecting the information, but being a copied or cc'ed recipient on an email may not be considered as a contact interaction for purposes of collecting the information associated therewith. Accordingly, collecting the information associated with each of the plurality of contact interactions may include collecting the information in response to a message associated with the contact interaction being directly addressed to the user or directly addressed by the user to at least one other user.

There are numerous mechanisms for gathering or collecting the contact interaction information from a source of the contact interaction information. For example, the information may be collected per event or contact interaction (each interaction) or on a batch basis or groups of interactions. The contact interactions may be grouped based on expiration of each prescheduled time period or after a present number of contact interactions occur.

The contact interaction information may also be collected or transmitted to a system that at least one of stores and analyzes the information on a pull versus push arrangement. For example, the source of the contact interaction information may invoke a mechanism for sending information to the system for storage and analysis or the system may invoke a mechanism for pulling or requesting the information from the source. The mechanism for collecting the contact interaction information may also be proprietary or standard mechanism for collecting the information. The proprietary mechanism may be exclusive to the communications service or source of the contact interaction information and may not be universally applicable over other services or sources. A standard mechanism may allow easier integration of additional systems or communications services provided by other vendors.

Accordingly, in one aspect of the invention, collecting the information associated with the plurality of contact interactions may include transmitting the information associated with each of the plurality of contact interactions to a system that at least one of stores and analyzes the information associated with each of the plurality of contact interactions each time one of the plurality of contact interactions occurs.

In accordance with another aspect of the invention, collecting the information associated with the plurality of contact interactions may include transmitting the information associated with each of the plurality of contact interactions to the system that at least one of stores and analyzes the information after each of a preset number of the plurality of contact interactions occurs.

In accordance with a further aspect of the invention, collecting the information associated with the plurality of contact interactions may include transmitting the information associated with each of the plurality of contact interactions to the system that at least one of stores and analyzes the information after expiration of a prescheduled time period. Collecting the information associated with the plurality of contact interactions may additionally include transmitting the information associated with each of the plurality of contact interactions to the system in response to a preset number of the plurality of contact interactions occurring before expiration of each prescheduled time period.

An exemplary implementation of the method 100 or system may provide both a pull and push mechanism. The pull mechanism may be based on a standard feed format such as Rich Site Summary (RSS) and the push mechanism may be based on an Extensible Mark-up Language (XML) file. The push and pull mechanism may be done on a scheduled basis. For example, a pull function may occur or the system may request or pull any accumulated information associated with contact interactions from the source at prescheduled time intervals, for instance every hour or some other practical time interval. A push operation or transmission of information by the source of the contact interaction information may occur in response to a preset number of interactions being available for pushing or transmitting to the system for analysis. The method 100 or system may therefore have a scheduling system and administration mechanism to set up contact sources and schedule pull events. The system may also provide a set of API entry points, for example Representational State Transfer (REST)-based Hypertext Transport Protocol (HTTP) APIs, to allow source systems to push their interactions either individually or in bulk to the system or database.

In block 104, the information associated with each contact interaction may be stored on a database. The database may be associated with the source of the contact interactions or the system that analyzes the contact interaction information. The information associated with each of the plurality of contact interactions collected and stored may include at least one of a username or identification of the user and at least one other user or participant associated with the contact interaction. Other information or metadata in addition to the username or identification information may also be collected and stored. Examples of other information that may be collected and stored that may be associated with each of the plurality of contact interactions may include, but is not necessarily limited to, a time of the contact interaction, an initiator of the contact interaction, a type of contact interaction, identification of other participants in the contact interaction and any other information that may be desirable in tracking and analyzing the contact interactions or usage of the different communications services of the user. The type of contact interaction may be the type of communications service used for the interaction, such email, instant messaging (IM), chat, forum, Facebook®, LinkedIn®, etc. or other type communications service. Accordingly, the database may include a list of user-to-user interactions and additional metadata associated with each contact interaction. This information may be stored in a relational database (RDB) or a non-relational database.

A user may have different usernames or identifications on the different services. Accordingly, different usernames or IDs of the same person may need to be correlated across the different services. Correlation between the usernames or IDs and a particular user or contact may be determined or requested from a particular user when the user registers with the system. For example, the user may need to associate a common identification used across all communications services with a username or ID used with this particular communications service. Examples of a common identification may include but is not necessarily limited to at least one of a last name and a first name, an electronic address or electronic ID.

In block 106, the contact interactions information may be analyzed. The analysis may determine at least one of a list of recent contacts 108 and a list of favorite contacts 110 or other relationships between user and other users or contacts of the user across the multiple communications services. The list of recent contacts may include all contact interactions by the user over a preceding, defined period of time. The list of favorite contacts may be the most frequent or a number of contact interactions with a particular other user that exceeds a predetermined threshold over a preset time period. Both lists represent a set of users which the target user most frequently interacts with. The list of recent contacts is heavily influenced by time (only those interactions in a particular configurable time period—perhaps a week, for example) and less influenced by the number of interactions. The list of favorite contacts may be analyzed over a longer time period, for example 6 months, and is more heavily influenced by number of interactions. The specific criteria for being on the favorites list may be tuned. For example, favorite contacts may a predetermined number of contact interactions over a preset time period, for example, require 20 interactions over 6 months, with at least one interaction in each month or other criteria.

The analysis could be performed at the time the contacts lists are requested. In another embodiment the analysis may be performed and the lists updated periodically. Queries may then be applied to the previously computed results. The periodic updating may be done on a scheduled basis or the analysis may be performed dynamically when the last computed results are older than a threshold time period, for example, if older than an hour. Accordingly, the list of most recent contacts may be re-determined after expiration of a preset time period. In further embodiment the analysis may be performed and the lists updated on a continuous basis, such as for example each time a communication or contact interaction occurs.

Figure 2A:
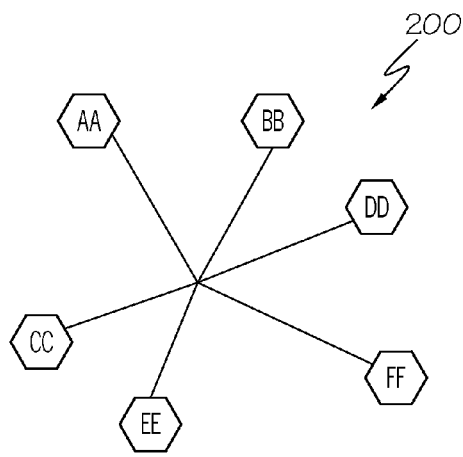
FIGS. 2A, 2B and 2C are each an example of a graphical user interface representing a network of the user based on the contacts lists in accordance with the present invention.
Figure 2B:
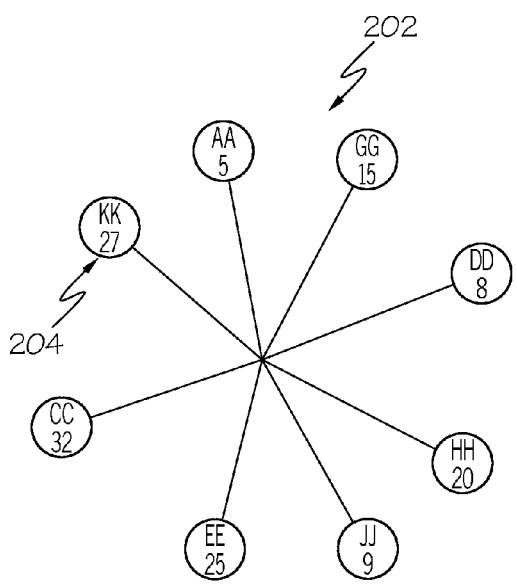
Figure 2C:
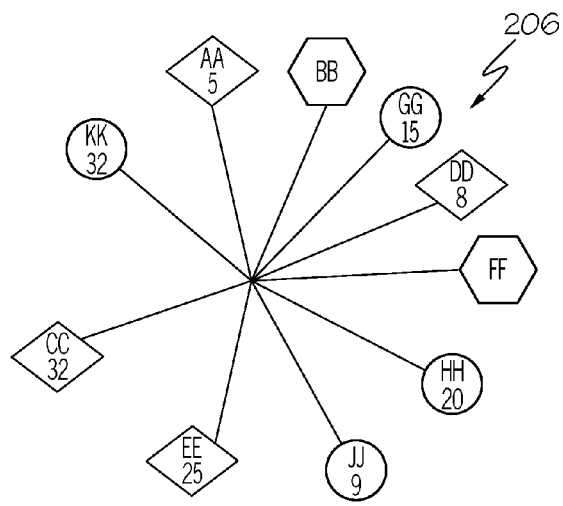

In block 112, the results of the analysis in block 106 may be used or accessed. One example of a use of the results of the analysis may include presenting a possible contact (addressee) from a partial query while the user is entering the contact in a GUI using a typeahead feature that accesses the recent and favorite contacts lists. Other possible uses may include displaying the recent contacts list in response to a request by the user and displaying the current favorites list in response to a request. A GUI may also be displayed showing a social network or networks of the user based on each of the contacts lists. Examples of GUIs representing different networks or social networks based on the contacts lists are illustrated in FIGS. 2A, 2B and 2C. Referring also to FIGS. 2A, 2B and 2C, FIG. 2A may represent an example of a social network 200 of the users recent contacts and FIG. 2B may represent an example of a social network 202 of the users favorite contacts. An indication 204 may also be displayed in the favorite contacts network 202 of the number of contact interactions associated with each contact during a preset time period. In the example illustrated in FIG. 2B the indication is the number of contact interactions associated with each contact. In another embodiment, the number of contact interactions may be represented by a size of the particular symbol corresponding to each contact. Accordingly, a contact with more contact interactions would be larger than a contact with fewer contact interactions and the size of the symbol for a particular contact would be based on the number contact interactions relative to other contacts in the network representation 202.

FIG. 2C may represent an example of a social network 206 including a combination of both the user's recent and favorite contacts. Any duplicate contacts in both contacts lists may only be represented once. In FIG. 2C, the recent contacts, favorite contacts and contacts in both lists may be distinguished from one another. For example, the recent contacts may be displayed in a first color and/or shape, the favorite contacts may be displayed in a second color and/or shape and the contacts that are in both the recent and favorite contacts list may be displayed in a third color and/or shape. The exemplary social network 206 illustrated in FIG. 2C illustrates the different types of contacts by different symbols.

Referring back to FIG. 1, in block 114, either of the contacts lists may be filtered based on a predetermined criterion. For example, the list of most recent contacts and the list of favorite contacts may be filtered based on the source of the contact interaction information or based on the communications service that generated the contact interaction information. The contact lists may also be filtered based on a time frame or range of dates that may be entered in a GUI or other mechanism, a number of contact interactions greater than a predetermined number entered into the GUI or may be filtered based on any other criteria. A weighting for a particular service or system may also be entered in a GUI for filtering the contact interaction information based on the service.

Figure 3:
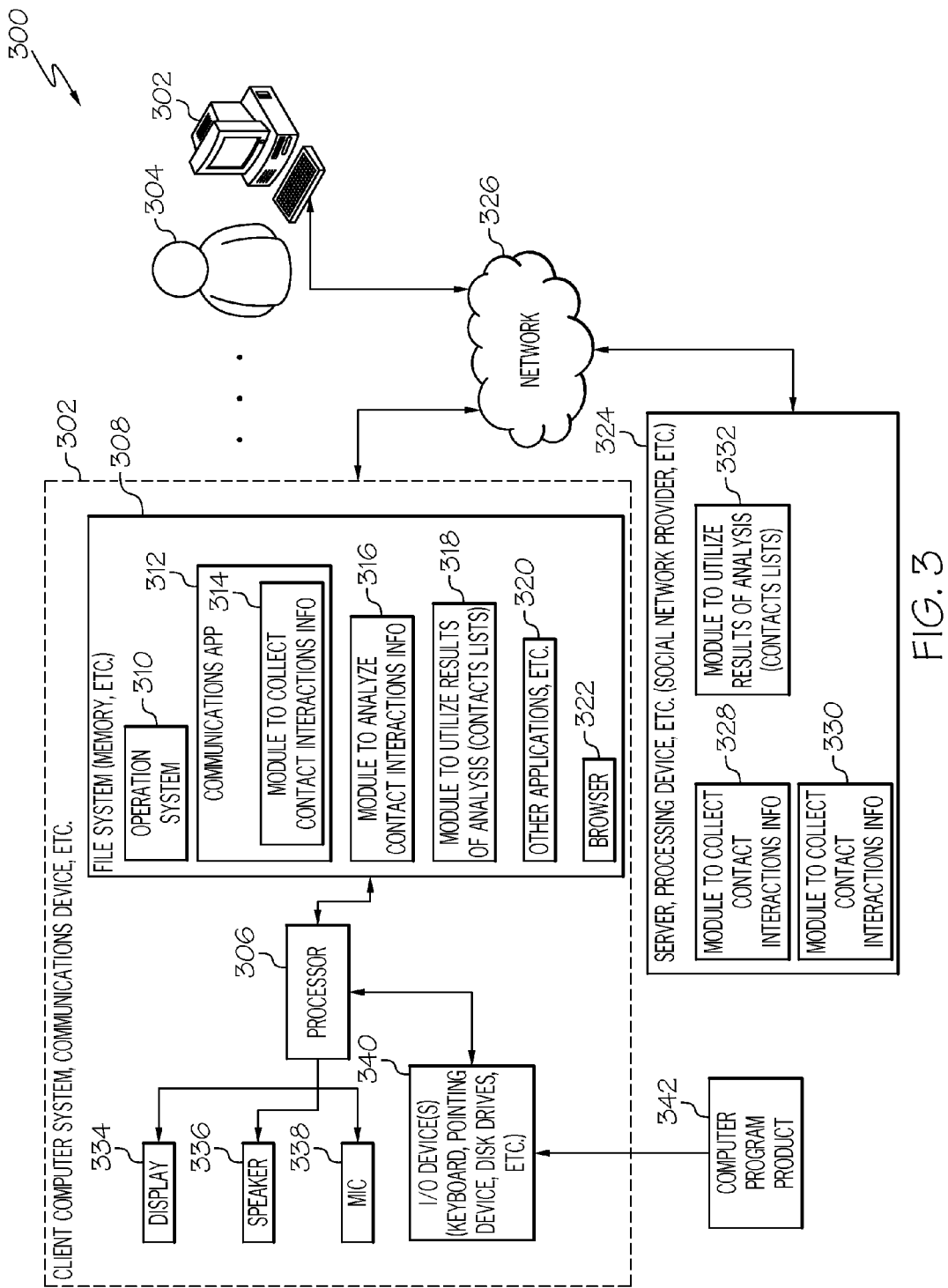
FIG. 3 is a block schematic diagram of an example of a system for tracking at least recent and favorite contacts across multiple communications services in accordance with an embodiment of the present invention.

FIG. 3 is a block schematic diagram of an example of a system 300 for tracking at least recent and favorite contacts across multiple communications services in accordance with an embodiment of the present invention. The method 100 and other exemplary features described herein with reference to FIGS. 1 and 2A-2C may be embodied in or performed by the system 300 or components of the system 300 as described below. The system 300 may include a computer system 302 for use by a user 304 for tracking the contact interaction and performing the other features or operations similar to those described herein. The computer system 302 may be any type of computer device capable of performing the functions or operations described herein.

The computer system 302 may include a processor 306 to control operation of the computer system 302 and a file system 308, memory or similar data storage device. An operating system 310 may be stored on the file system 308 for running or operating on the processor 306. A communications app or application 312 may be stored on the file system 308 for operation on the processor 306. The communications app 312 may operate in association with a communications service similar to that described herein, such as email, IM, chat, a social network (Facebook®, LinkedIn®, etc.) or other type communications service for which contacts may desirably be tracked similar to that described herein.

In accordance with an embodiment of the present invention, the communications app may include a module 314 to collect or gather information associated with contact interactions similar to that described herein. In another embodiment, the module 314 to collect contact interactions information may be a separate component from the communications app 312.

A module 316 to analyze the collected contact interaction information and a module 318 to utilize the results of the analysis of the contact interaction information may also be stored on the file system 308 for operation on the processor 306 to perform the functions and operations described herein. The module 316 to analyze the collected contact interaction information may perform operations similar to those described with respect to block 106 in FIG. 1. Block 106 may be embodied in the module 316 and may generate at least a recent contacts list 108 and a favorites contacts list 110. The module 318 to utilize the results of the analysis may perform operations similar to those described with respect to block 112 in FIG. 1. Block 112 may be embodied in the module 318. Other applications 320, software programs or the like may also be stored on the file system 308 for operation on the processor 306. A web or Internet browser 322 may also be stored on the file system 308 for accessing one or more resources, such as a server 324 via the network 326. The server 324 may host a communications service or system or social network as defined herein. The network 326 may be the Internet, intranet or other network.

In accordance with an embodiment, the server 324 or processing device may include a module 328 to collect contact interactions information. The module 328 to collect contact interactions information may be the same as the module 314 on computer system 302. The module 328 to collect contact interactions information on the server 324 may be provided in addition to the module 314 on the computer system 302. In another embodiment, only the module 328 on the server 324 may be provided, such as in a cloud computing environment or similar arrangement. The module 328 would then be accessed via the network 326 using the browser 322 of the computer system or computing device 302. In a further embodiment, where both modules 314 and 328 are provided, module 314 on the computer system 302 may perform some of the operations described herein and the module 328 on the server 324 may perform other functions in coordination with the module 314.

In accordance with an embodiment of the present invention, a module 330 to analyze the contact interactions information and a module 332 to utilize the results of the analysis may be provided on the server 324. The analysis module 330 and utilization module 332 may be the same as modules 316 and 318, respectively, on the computer device 302 and may perform substantially the same functions. The analysis module 330 on the server 324 may be provided instead of the module 316 on the computer device 302 or both modules may be provided and may operate in coordination with one another to perform the analysis operations and generate the results (recent contacts list, favorites contacts list, etc.) described herein.

The computer system 302 may also include a display 334 for presenting user interfaces, graphical displays as well as other content as described herein. The computer system 302 may also include a speaker system 336 for presenting any audio content. The computer system 302 may additionally include a microphone 338 for the user 304 to aurally communicate via the computer system 302 or control the computer system 302 via voice commands.

The computer system 302 may further include one or more input devices, output devices or combination input/output devices, collectively I/O devices 340. The I/O devices 340 may include a keyboard, pointing device, such as a mouse or other computer pointing device, disk drives and any other devices to permit a user, such as user 304, to interface with and control operation of the computer system 302 and network resources, such as server 324. The modules 312, 316 and 318 and other applications 320 may be loaded on the computer system 302 from a computer program product, such as computer program product 342 using one of the input devices 340. The computer program product 342 or a similar computer program product may also be used to load the modules 328, 330 and 332 on the server 324. The computer program product 342 may be embodied in a form similar that previously described.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for tracking at least recent contacts and favorite contacts across multiple communications services, the system comprising:
    a processor;
    a module operating on the processor, the module being configured to cause the processor to perform a set of functions comprising:
    collecting information associated with a plurality of contact interactions of a user from each of a set of different communications services utilized by the user, the plurality of content interactions comprising a plurality of communications between the user and a multiplicity of other users over the set of different communications services;
    storing the information associated with each of the plurality of contact interactions on a storage device;
    analyzing the information associated with each of the plurality of contact interactions;
    determining at least one of a list of most recent contacts and a list of favorite contacts from analyzing the information associated with each of the plurality of contact interactions; and
    displaying a graphical user interface showing a network of the user based on at least one of the list of most recent contacts and the list of favorite contacts, wherein the graphical user interface comprises a symbol identifying each of the multiplicity of other users, the symbol of a particular user of the multiplicity of other users being automatically set by the system to a first symbol comprising a first shape in response to the particular user being on the list of most recent contacts based on analyzing the information associated with each of the plurality of contact interactions, and the symbol of the particular user being automatically set by the system to a second symbol comprising a second shape different from the first shape in response to the particular user being on the list of favorite contacts based on analyzing the information associated with each of the plurality of contact interaction, wherein the network of the user comprises a hub and spoke configuration, each other user of the multiplicity of users being identified by the symbol at an end of the spoke opposite the hub based on the other user being on the list of most recent contacts, the list of favorite contacts, or the other user being on both the list of most recent contacts and the list of favorite contacts.

2. The system of claim 1, wherein collecting information associated with the plurality of contact interactions comprises collecting the information in response to one of each contact interaction, after a predetermined number of contact interactions, and after a preset time period.

3. The system of claim 1, further comprising wherein the information associated with each contact interaction comprises at least information associated with the user and at least one contact associated with the contact interaction.

4. A computer program product for tracking at least recent contacts and favorite contacts across multiple communications services, the computer program product comprising:
    a non-transitory computer readable storage medium having computer readable program code embodied therewith, the computer readable program code being executable by a device to cause the device to perform a method comprising:
    collecting information associated with a plurality of contact interactions of a user from each of a set of different communications services utilized by the user, the plurality of content interactions comprising a plurality of communications between the user and a multiplicity of other users over the set of different communications services;
    storing the information associated with each of the plurality of contact interactions;
    analyzing the information associated with each of the plurality of contact interactions;
    determining at least one of a list of most recent contacts and a list of favorite contacts from analyzing the information associated with each of the plurality of contact interactions; and
    displaying a graphical user interface showing a network of the user based on at least one of the list of most recent contacts and the list of favorite contacts, wherein the graphical user interface comprises a symbol corresponding to each of the multiplicity of other users, the symbol of a particular user of the multiplicity of other users being automatically set by the system to a first symbol comprising a first shape in response to the particular user being on the list of most recent contacts based on analyzing the information associated with each of the plurality of contact interactions, and the symbol of the particular user being automatically set by the system to a second symbol comprising a second shape different from the first shape in response to the particular user being on the list of favorite contacts based on analyzing the information associated with each of the plurality of contact interactions, wherein the network of the user comprises a hub and spoke configuration, each other user of the multiplicity of users being identified by the symbol at an end of the spoke opposite the hub based on the other user being on the list of most recent contacts, the list of favorite contacts, or the other user being on both the list of most recent contacts and the list of favorite contacts.

5. The computer program product of claim 4, wherein the method further comprises collecting the information in response to one of each contact interaction, after a predetermined number of contact interactions, and after a preset time period.

6. The system of claim 1, wherein the information associated with each of the plurality of contact interactions is collected based on a predetermined criteria, the predetermined criteria being determined by one of a source of the information associated with the contact interactions or a system that analyzes the information associated with the contact interactions.

7. The system of claim 1, wherein collecting the information associated with each of the plurality of contact interactions comprises collecting the information in response to a message associated with the contact interaction being directly addressed to the user or directly addressed by the user to at least one other user, the information associated with each of the plurality of contact interactions comprising at least one of a username and identification of the user and the at least one other user.

8. The system of claim 7, wherein the information associated with each of the plurality of contact interactions further comprises a time of the contact interaction, an initiator of the contact interaction, a type of contact interaction and identification of other participants in the contact interaction.

9. The system of claim 1, wherein collecting the information associated with the plurality of contact interactions comprises transmitting the information associated with each of the plurality of contact interactions to a second system that at least one of stores and analyzes the information associated with each of the plurality of contact interactions each time one of the plurality of contact interactions occurs.

10. The system of claim 1, wherein collecting the information associated with the plurality of contact interactions comprises transmitting the information associated with each of the plurality of contact interactions to a second system that at least one of stores and analyzes the information after each of a preset number of the plurality of contact interactions occurs.

11. The system of claim 1, wherein collecting the information associated with the plurality of contact interactions comprises transmitting the information associated with each of the plurality of contact interactions to a second system that at least one of stores and analyzes the information after expiration of a prescheduled time period.

12. The system of claim 11, wherein collecting the information associated with the plurality of contact interactions comprises transmitting the information associated with each of the plurality of contact interactions to a second system that at least one of stores and analyzes the information in response to a preset number of the plurality of contact interactions occurring before expiration of each prescheduled time period.

13. The system of claim 1, wherein collecting the information associated with the plurality of contact interactions comprises transmitting the information associated with each of the plurality of contact interactions to a second system that at least one of stores and analyzes the information in response to the second system requesting the information.

14. The system of claim 1, wherein determining the list of favorite contacts comprises determining a number of contact interactions over a preset time period, a favorite contact exceeding a threshold number of contact interactions during the preset time period.

15. The system of claim 1, wherein the set of functions further comprises re-determining the list of most recent contacts after expiration of a preset time period.

16. The system of claim 1, wherein the set of functions further comprises displaying a possible contact from a partial query while the user is entering a contact using at least one of the list of most recent contacts and the list of favorite contacts.

17. The system of claim 1, wherein the set of functions further comprises allowing filtering of the list of most recent contacts and the list of favorite contacts based on the communications service.

18. The system of claim 17, wherein allowing the filtering further comprises allowing a weighting to be assigned to each communications service.

19. The system of claim 1, wherein a numeral that corresponds to a number of contact interactions between the user and each of the multiplicity of other users is displayed in association with the symbol corresponding to each of the particular other users.

20. The system of claim 1, wherein the symbol for the particular user is automatically set by the system to a third symbol comprising a third shape different from the first shape and the second shape in response to the particular user being on both the list of most recent contacts and the list of favorite contacts.

21. A system for tracking at least recent contacts and favorite contacts across multiple communications services, the system comprising:

a processor;

a module operating on the processor, the module being configured to perform a set of functions comprising:

collecting information associated with a plurality of contact interactions of a user from each of a set of different communications services utilized by the user, the plurality of content interactions comprising a plurality of communications between the user and a multiplicity of other users over the set of different communications services;

storing the information associated with each of the plurality of contact interactions on a storage device;

analyzing the information associated with each of the plurality of contact interactions;

determining at least one of a list of most recent contacts and a list of favorite contacts from analyzing the information associated with each of the plurality of contact interactions; and displaying a graphical user interface showing a network of the user based on at least one of the list of most recent contacts and the list of favorite contacts, wherein the graphical user interface comprises a symbol identifying each of the multiplicity of other users, the symbol of a particular user of the multiplicity of other users being automatically set by the system to a first symbol comprising a first shape in response to the particular user being on the list of most recent contacts based on analyzing the information associated with each of the plurality of contact interactions, the symbol of the particular user being automatically set by the system to a second symbol comprising a second shape different from the first shape in response to the particular user being on the list of favorite contacts based on analyzing the information associated with each of the plurality of contact interaction, and the symbol for the particular user being automatically set by the system to a third symbol comprising a third shape different from the first shape and the second shape in response to the particular user being on both the list of most recent contacts and the list of favorite contacts, wherein the network of the user comprises a hub and spoke configuration, each other user of the multiplicity of other users being identified within one of the first symbol, the second symbol and the third symbol at an end of the spoke opposite the hub based on the other user being on the list of most recent contacts, the list of favorite contacts or the other user being on both the list of most recent contacts and the list of favorite contacts, the symbol being automatically set in response to which list the other user is on.

22. The system of claim 1, wherein the symbol for each other user of the multiplicity of other users is sized based on the number of contact interactions between the user and each other user that corresponds to the symbol.

* * * * *